United States Patent [19]

Sumiyoshi

[11] Patent Number: 4,882,624

[45] Date of Patent: Nov. 21, 1989

[54] SYNCHRONIZING SIGNAL SEPARATION CIRCUIT FOR A TELEVISION RECEIVER

[75] Inventor: Hajime Sumiyoshi, Fukaya, Japan

[73] Assignee: Kabushiki Kaisha Toshiba, Kanagawa, Japan

[21] Appl. No.: 167,141

[22] Filed: Mar. 11, 1988

[30] Foreign Application Priority Data

Mar. 13, 1987 [JP] Japan .................................. 62-56752

[51] Int. Cl.⁴ ............................................. H04N 5/08
[52] U.S. Cl. ..................................... 358/153; 358/148
[58] Field of Search ............... 358/148, 150, 153, 154, 358/155, 156, 157; 328/139

[56] References Cited

U.S. PATENT DOCUMENTS

| | | | |
|---|---|---|---|
| 4,185,229 | 1/1980 | Harford | 358/153 |
| 4,414,569 | 11/1983 | Tokuda et al. | 358/153 |
| 4,463,379 | 7/1984 | Hosoya | 358/153 |
| 4,621,289 | 11/1986 | Bart et al. | 358/153 |
| 4,745,477 | 5/1988 | Bell et al. | 358/153 |

FOREIGN PATENT DOCUMENTS

| | | |
|---|---|---|
| 0058729 | 9/1982 | European Pat. Off. |
| 281771 | 12/1986 | Japan . |
| 84379 | 4/1988 | Japan . |
| 1497604 | 1/1978 | United Kingdom . |
| 2029158 | 3/1980 | United Kingdom . |
| 2090499 | 7/1982 | United Kingdom . |

OTHER PUBLICATIONS

S. Coccetti et al., "New LSI I.C. Leads the Way to 5V TV sets," IEEE Transactions on Consumer Electronics, vol. CE-29, No. 3, Aug. 1983.

Primary Examiner—John W. Shepperd
Assistant Examiner—Michael D. Parker
Attorney, Agent, or Firm—Finnegan, Henderson, Farabow, Garrett, and Dunner

[57] ABSTRACT

A synchronizing signal separation circuit for separating a composite synchronizing signal having a variable peak voltage subject to changes from a composite video signal, the composite synchronizing signal including a vertical synchronizing signal having a predetermined level for controlling vertical scanning in a television receiver. The separation circuit includes a composite separation circuit for separating the composite synchronizing signal from the composite video signal received from a source of video signals and a charge control circuit for maintaining the stability and the predetermined level of the vertical synchronizing signal after changes in synchronizing signal peak voltage.

9 Claims, 7 Drawing Sheets

SYNCHRONIZING SIGNAL SEPARATION CIRCUIT FOR A TELEVISION RECEIVER

FIELD OF THE INVENTION

The present invention relates to a synchronizing signal separation circuit for a television receiver, and more particularly to a composite synchronizing signal separation circuit for a television receiver.

BACKGROUND OF THE INVENTION

A synchronizing signal separation circuit is generally used for separating the composite synchronizing signal from the composite video signal in a television receiver.

FIG. 1 shows a typical example of a conventional synchronizing pulse separation circuit, which can operate on a composite video signal obtained by a television receiver.

Referring now to FIG. 1, a circuit construction of the composite synchronizing signal separation circuit 10 will be described in detail hereafter. The composite synchronizing signal separation circuit 10 is provided with an input terminal 12 for receiving a composite video signal AV. The composite video signal AV is obtained from a tuner circuit (not shown in the drawing) of a television receiver.

The composite synchronizing signal separation circuit 10 includes three transistors 14, 16, and 18, two diodes 20 and 22, five resistors 24, 26, 28, 30, and 32, a capacitor (referred as a coupling capacitor hereafter) 34, a reference voltage source 36 and a constant current source 38. The reference voltage source 36 and the constant current source 38 provide a prescribed reference voltage E1 and a prescribed constant current I1, respectively.

The emitter of the transistor 14 is coupled to the input terminal 12 of the composite synchronizing signal separation circuit 10 in series through the first capacitor 34 and the resistor 24. Further, the emitter of the transistor 14 is coupled to a grounded terminal 40 through the constant current source 38. The base of the transistor 40 is coupled to the grounded terminal 40 through the reference voltage source 36. The collector of the transistor 14 is coupled in series to a power supply source line 42 through the diodes 20 and 22. Further, the collector of the transistor 14 is coupled to the base of the transistor 16.

The emitter of the transistor 16 is coupled to its base through the resistor 28. Further, the emitter of the transistor 16 is coupled to the power supply source line 42 through the resistor 26. The collector of the transistor 16 is coupled to the grounded terminal 40 through the resistor 30. Further, the collector of the transistor 16 is coupled to the base of the transistor 18.

The collector of the transistor 18 is coupled to the power supply source line 42. The emitter of the transistor 18 is coupled to the grounded terminal 40 through the resistor 32. Thus, the transistor 18 and the resistor 32 constitute an emitter follower circuit 44. The emitter of the transistor 18 is coupled to an output terminal 46 of the composite synchronizing signal separation circuit 10 for outputting the composite synchronizing signal CS.

The composite video signal AV is supplied to the emitter of the transistor 14 through the coupling capacitor 34 and the resistor 24, as described above. The coupling capacitor 34 and the resistor 24 constitute a series time constant circuit 48. The time constant T48 of the series time constant circuit 48 is defined by the resistance R24 of the resistor 24 and the capacitance C34 of the coupling capacitor 34 and is expressed by the equation: T48 = R24·C34.

The composite video signal AV is required to have at least a prescribed threshold voltage Vth to cause the transistor 14 to conduct. The threshold voltage Vth is given by the following equation, provided that the time constant T48 is sufficiently larger than the horizontal line period Th of the horizontal signal.

$$\frac{Vth}{R24} \cdot Ts = I1 \cdot (Th - Ts) \quad (1)$$

wherein;
Ts; Synchronizing signal period, and
I1; Current of the constant current source 38.

The equation (1) is changed as follows;

$$Vth = \frac{Th - Ts}{Ts} \cdot I1 \cdot R24 \quad (2)$$

When the transistor 14 is conductive, a current I14 expressed by [(Th−Ts)/Ts]·I1 flows through the collector of the transistor 14. A partial current I28 of the current I14 flows through the resistors 26 and 28 so that the transistor 16 becomes conductive. As a result, the composite synchronizing signal CS is output from the emitter of the transistor 18. At this time, a clamp circuit 50 formed by the diodes 20 and 22 is activated, so that the base potential Vb16 of the transistor 16 is held at a value expressed as (Vcc−2·Vf) and the emitter current Ie16 of the transistor 16 is held at a value expressed as Vf/R28, where Vf is the forward voltage drop of the diodes, such as the diodes 20 and 22, and R28 is the resistance of the resistor 28.

As mentioned above, for obtaining the composite synchronizing signal CS from the emitter of the transistor 18, the partial current I28 flowing through the resistor 28 is required to be at least a value expressed by Vf/R28 to make the transistor 16 conductive. The partial current I28 depends on the conductivity of the transistor 14. Thus, the actual threshold voltage becomes smaller than the previous threshold value Vth. If the actual threshold voltage is assumed as Vth·a, the voltage Vth·a is given by the following equation:

$$Vth \cdot a = \frac{Th - Ts}{Ts} \cdot I1 \cdot R24 - \frac{R24}{R28} \cdot Vf \quad (3)$$

The composite synchronizing signal CS obtained on the emitter of the transistor 18 is supplied to the output terminal 46 through the emitter follower circuit 44. As a result, the composite synchronizing signal CS is output to the output terminal 46.

However, such a conventional synchronizing signal separation circuit 10 has a drawback. In the composite video signal AV, the peak voltage of the composite synchronizing signal component CS may suddenly change. If the composite video signal AV is the signal applied from a VTR (abbreviation of Video Tape Recorder), the composite video signal AV is processed an APL (abbreviation of Average Picture Level) control. The APL operation controls the composite video signal AV so that the positive and negative signal intensities of the signal AV are unified or averaged. As a result, the peak level of the composite synchronizing signal component CS often changes. Such a peak level change of the composite synchronizing signal component CS deteriorates the stability of the signal separating operation of the composite synchronizing signal separation circuit 10. As a result, the composite synchronizing signal component CS obtained by the composite synchronizing signal separation circuit 10 becomes unstable.

The above-mentioned problem can be solved if the response characteristics of the composite synchronizing signal separation circuit 10 for the composite video signal AV are improved. This is done by making the capacitance C34 of the coupling capacitor 34 small. However, reducing the capacitance C34 of the coupling capacitor 34 causes another problem in that the coupling capacitor 34 is still charged for the period of the vertical synchronizing signal component VS in the composite synchronizing signal CS.

The problem of the small capacitance C34-s of the coupling capacitor 34 will be briefly described in reference to FIG. 2. As shown in FIG. 2, the composite synchronizing signal CS includes horizontal synchronizing signals HS, equalizing signals ES and the vertical synchronizing signals VS. The equalizing signals ES and the vertical synchronizing signals VS are located in the vertical blanking period, as shown in the drawing. As is well known, the pulse widths of the horizontal synchronizing signals HS and the equalizing signals ES are as short as about 4.7 $\mu$s and 2.5 $\mu$s. On the other hand, the pulse width of each of the veritcal synchronizing signals VS is about 27 $\mu$s which is extremely longer than those of the horizontal synchronizing signals HS and the equalizing signals ES, i.e., about 4.7 $\mu$s and 2.5 $\mu$s. The vertical synchronizing signals VS are serrated from each other by serrated pulses SP with pulse width of about 5 $\mu$s. According to the above fact, the charge of the coupling capacitor 34 is accumulated without being sufficiently discharged in the period of the serrated pulses SP between the vertical synchronizing signals VS, when the capacitance C34 of the coupling capacitor 34 is small. As a result, the vertical synchronizing signals VS sag, as shown by the broken line graph in the drawing. When the sagging advances, the peak level of the vertical synchronizing signals VS or the equalizing signals ES exceeds the threshold level Vth of the transistor 14 (see FIG. 1). Thus, the emitter potential of the transistor 14 fluctuates in response to the charged potential of the capacitor 34. This causes the composite synchronizing signal CS and the vertical synchronizing signal VS to sag during the cycle of the vertical synchronizing signal VS. This also causes other problems, such as curving of horizontal images and deterioration of the stability of synchronization.

SUMMARY OF THE INVENTION

It is, therefore, an object of the present invention to provide a synchronizing signal separation circuit for a television receiver which provides stable synchronizing signals without causing sag in vertical frequency while maintaining a relatively small value for the coupling capacitor receiving the input composite video signal.

In order to achieve the above object, a synchronizing signal separation circuit according to one aspect of the present invention includes a composite separation circuit for separating the composite synchronizing signal from the composite video signal received from a source of video signals and a charge control circuit for maintaining the stability and the predetermined level of the vertical synchronizing signal after sudden changes in synchronizing signal peak voltage.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
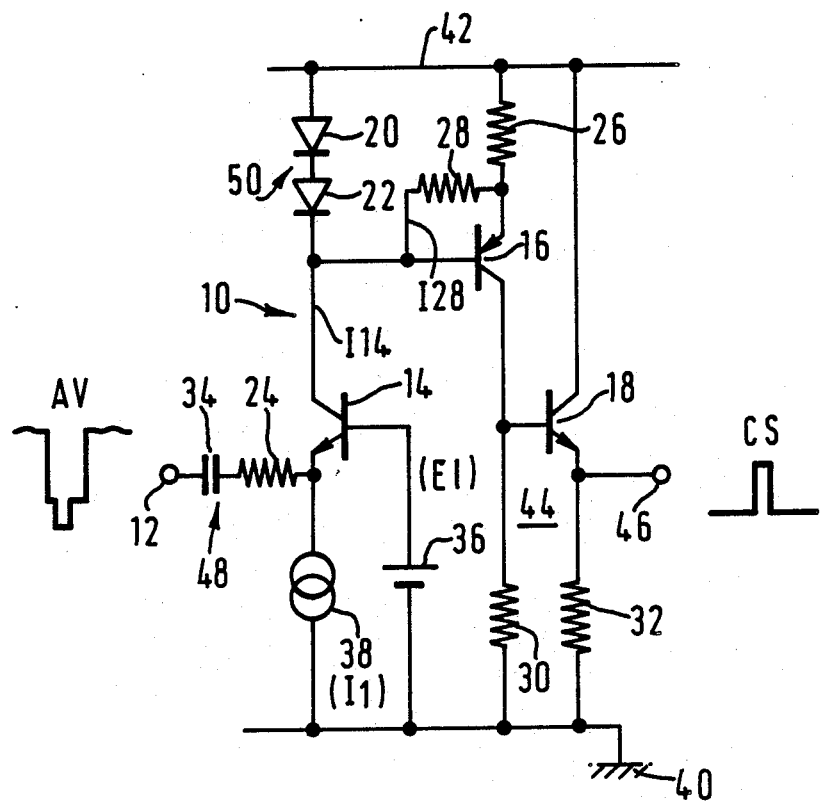
FIG. 1 is a circuit diagram showing a conventional composite synchronizing signal separation circuit.
Figure 2:
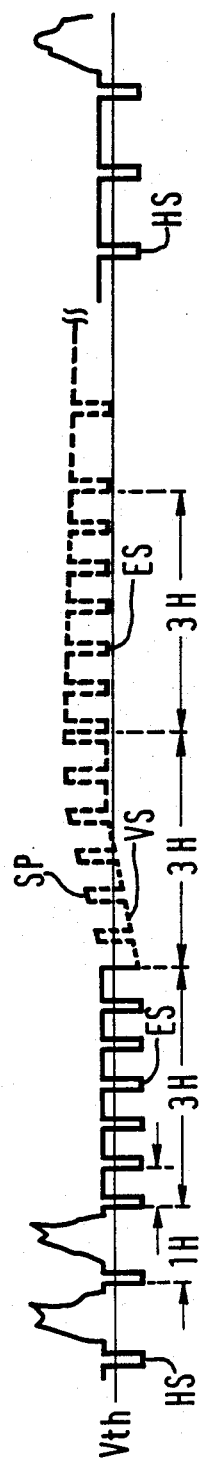
FIG. 2 is an graph showing the detail of the composite synchronizing signal CS for explaining the operation of the circuit of FIG. 1.

The present invention will now be described in detail with reference to the accompanying drawings, namely, FIGS. 3 to 8. Throughout the drawings, like reference numerals and letters are used in FIG. 1 (prior art) to designate like or equivalent elements for the sake of simplicity of explanation.

Figure 3:
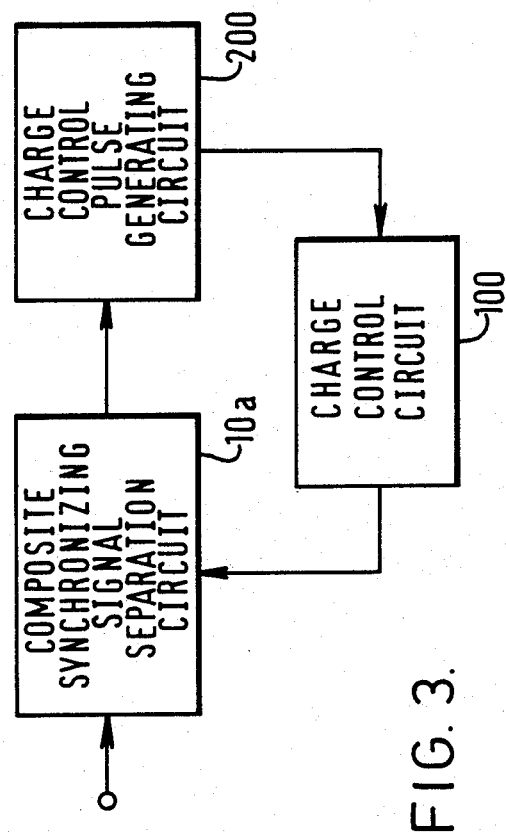
FIG. 3 is a block diagram showing an embodiment of the composite synchronizing signal separation circuit system according to the present invention.

Referring now to FIG. 3, there is shown an embodiment of a composite synchronizing signal separation circuit system for a television receiver according to the present invention.

In FIG. 3, the composite synchronizing signal separation circuit system includes a composite synchronizing signal separation circuit 10a, a charge control circuit 100 and a charge control pulse generating circuit 200. The charge control pulse generating circuit 200 generates a charge control pulse CP in response to the composite synchronizing signal separation circuit 10a. The charge control pulse CP is applied to the composite synchronizing signal separation circuit 10a through the charge control circuit 100.

Figure 4:
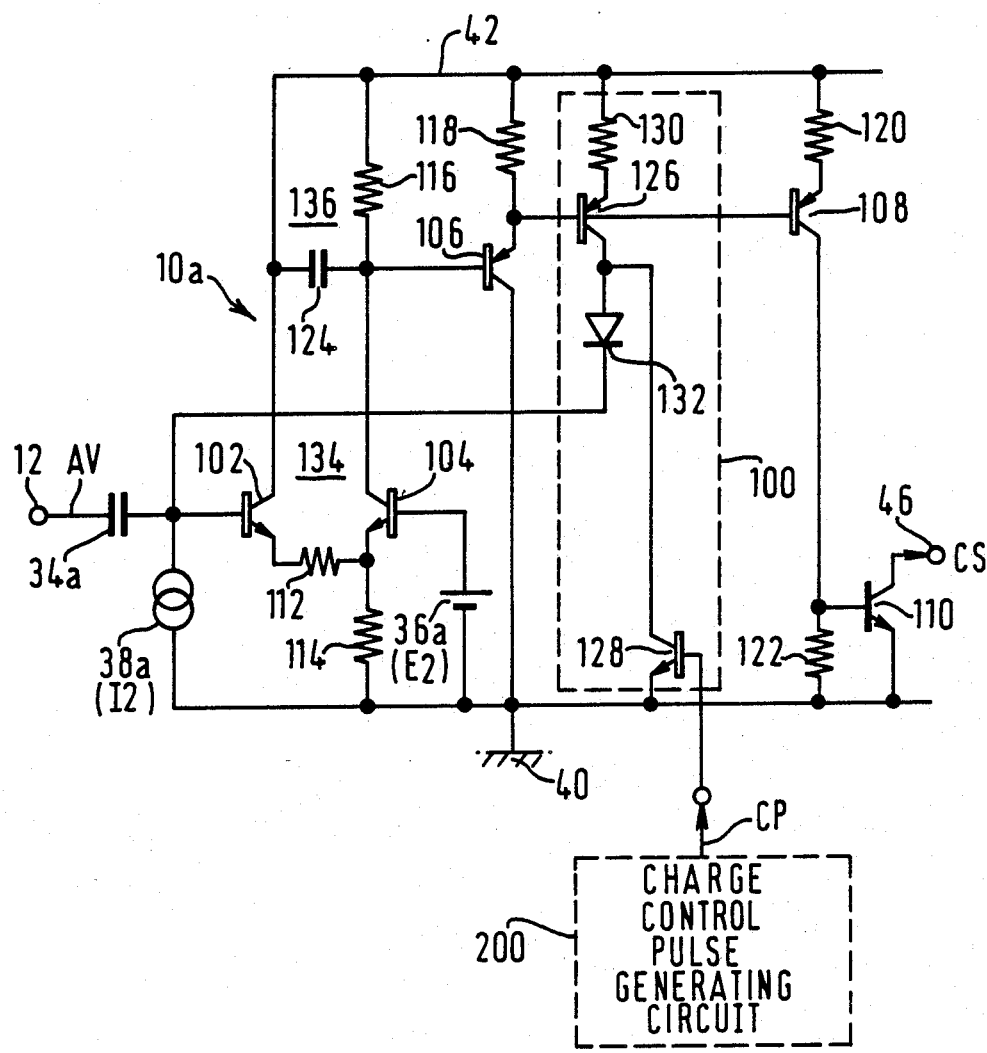
FIG. 4 is a circuit diagram showing the construction of the composite synchronizing signal separation circuit 10 of FIG. 3.

Referring now to FIG. 4, a practical example of the composite synchronizing signal separation circuit 10a will be described in detail. The composite synchronizing signal separation circuit 10a is provided with an input terminal 12 for receiving a composite video signal AV. The composite video signal AV is obtained from a tuner circuit (not shown in the drawing) of a television receiver.

The composite synchronizing signal separation circuit 10a includes five transistors 102, 104, 106, 108, and 110, six resistors, 112, 114, 116, 118, 120, and 122, a coupling capacitor 34a with a relatively small capacitance, another capacitor 124, a reference voltage source 36a and a constant current source 38a. The reference voltage source 36a and the constant current source 38a provide prescribed reference voltage E2 and constant current I2, respectively.

The base of the transistor 102 is coupled to the input terminal 12 of the composite synchronizing signal separation circuit 10a through the coupling capacitor 34a. Further, the base of the transistor 102 is coupled to a grounded terminal 40 through the constant current source 38a. The collector of the transistor 102 is coupled to a power supply source line 42. The emitter of the transistor 102 is coupled to the emitter of the transistor 104 through the resistor 112. The emitter of the transistor 104 is coupled to a grounded terminal 40 through the resistor 114. The base of the transistor 104 is coupled to the grounded terminal 40 through the reference voltage source 36a. The collector of the transistor 104 is coupled to the power supply source line 42 through the resistor 116. Further, the collector of the transistor 104 is coupled to the collector of the transistor 102 through the capacitor 124, and directly to the base of the transistor 106. The collector of the transisor 106 is coupled to the grounded terminal 40.

The emitter of the transistor 106 is coupled to the power supply source line 42 through the resistor 118. Further, the emitter of the transistor 106 is coupled to both the base of the transistor 108 and the charge control circuit 100 (see FIG. 3), as described later. The emitter of the transistor 108 is coupled to the power supply source line 42 through the resistor 120. The collector of the transistor 108 is coupled to the grounded terminal 40 through the resistor 122. Further, the collector of the transistor 108 is coupled to the base of the transistor 110.

The emitter of the transistor 110 is coupled to the grounded terminal 40. The collector of the transistor 110 is coupled to an output terminal 46 of the composite synchronizing signal separation circuit 10a.

The charge control circuit 100 includes two transistors 126 and 128, a resistor 130 and a diode 132. The base of the transistor 126 is coupled to the emitter of the transistor 106 in the composite synchronizing signal separation circuit 10a. The emitter of the transistor 126 is coupled to the power supply source line 42 through the resistor 130. The collector of the transistor 126 is coupled to base of the transistor 102 through the diode 132 in the forward bias direction. Further, the collector of the transistor 126 is coupled to the collector of the transistor 128. The emitter of the transistor 128 is coupled to the grounded terminal 40. The base of the transistor 128 is coupled to the charge control pulse generating circuit 200 (see FIG. 3) for receiving the charge control pulse CP, as described later.

The composite synchronizing signal separation circuit 10a thus constituted separates the composite synchronizing signal CS from the composite video signal AV. The charge control circuit 100 controls the charging/discharging operation to the coupling capacitor 34a in the composite synchronizing signal separation circuit 10a in response to the charge control pulse generating circuit 200.

The operation of the composite synchronizing signal separation circuit 10a is explained in more detail below. An input signal, i.e., the composite video signal AV is applied to the base of the transistor 102 through the coupling capacitor 34a. The composite video signal AV is amplified by the amplifier 134 formed by the transistors 102 and 104. The composite video signal AV obtained on the collector of the transistor 104 is applied to an integrating circuit, i.e., a low pass filter 136 formed by the resistor 116 and the capacitor 124. Thus, undesired noises and burst signals in the composite video signal AV are filtered out through the integrating circuit 136.

The composite video signal AV is then supplied to the base of the transistor 106. Hereupon, the transistor 126 in the charge control circuit 100 as well as the transistors 106 and 108 are turned on in the period corresponding to the composite synchronizing signal CS in the composite video signal AV. Thus, a current flows in series through the resistor 130, the transistor 126 and the diode 132, so that the charging into the coupling capacitor 34a is carried out.

During the period of synchronizing signals, the transistor 108 is turned on, so that the composite synchronizing signal CS of the low level is obtained on the collector of the transistor 110. The composite synchronizing signal CS is output to an output terminal 46 of the composite synchronizing signal separation circuit 10a through the transistor 110.

In the period other than that of the synchronizing signals, the charge stored in the coupling capacitor 34a is discharged through the constant current source 38a.

When a threshold voltage for the separation of the composite synchronizing signal CS from the composite video signal AV is assumed as Vth at the base of the transistor 106, the following equation is obtained for a steady state of the circuit;

$$\frac{Vth}{R130} \cdot Ts = I2 \cdot Th \quad (4)$$

wherein R130 represents the resistance of the resistor R130, and Ts and Th are the same as those in equation (1).

The left term of the Equation (4) shows the charge quantity into the coupling capacitor 34a, while the right term shows the discharge quantity from the coupling capacitor 34a. This is because the charge quantity and discharge quantity of the coupling capacitor 34a are equal in the steady state.

Therefore, the threshold voltage Vth·b for separating the composite synchronizing signal CS from the composite video signal AV becomes:

$$Vth \cdot b = \frac{Th}{Ts} \cdot I2 \cdot R130 \cdot \frac{1}{G134} \quad (5)$$

wherein G134 is the gain of the amplifier 134.

When the transistor 128 is turned on, the current flowing through the transistor 126 flows to the grounded terminal 40 through the transistor 128. The transistor 128 is turned on by the charge control pulse CP applied from the charge control pulse generating circuit 200. As a result, the charging to the coupling capacitor 34a is not performed. The diode 132 prevents a reverse current flow from the coupling capacitor 34a to the transistor 126.

The charge control pulse CP is set so that it appears at least for the period of the vertical synchronizing signal VS or longer, as described later. Thus, the charging of the coupling capacitor 34a is stopped during the period of the charge control pulse CP. As a result, the vertical synchronizing signal VS is prevented from the sagging due to the charge operation to the coupling capacitor 34a. Then, the capacitance of the coupling capacitor 34a can be reduced for obtaining sufficient response characteristics of the circuit 10a to the composite video signal AV.

Figure 5:
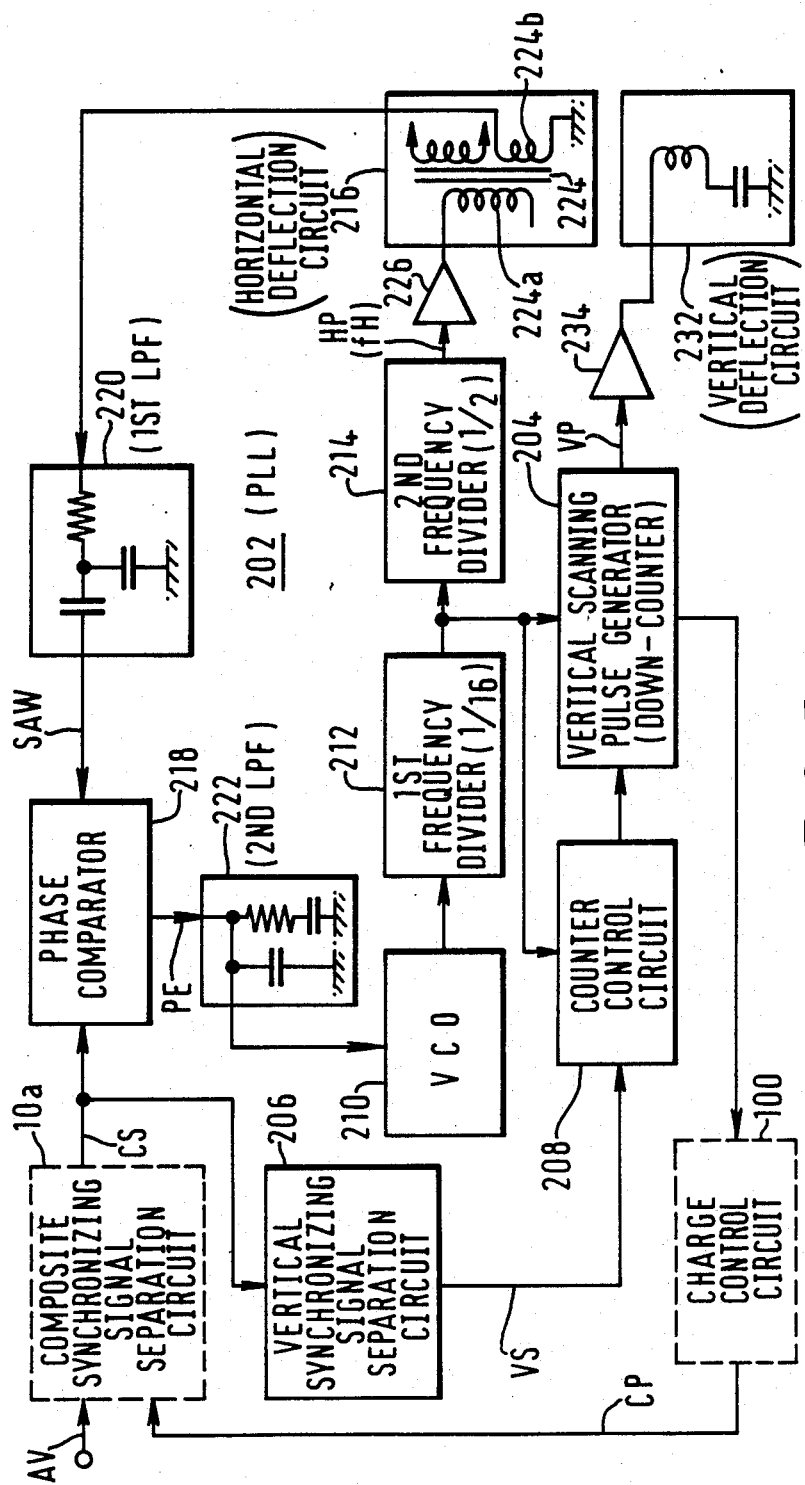
FIG. 5 is a circuit diagram showing the construction of the control pulse generating circuit of FIG. 3.

Referring now to FIG. 5, a practical example of the charge control signal generating circuit 200 will be described. The charge control signal generating circuit 200 can be given by making use of a conventional synchronizing circuits for horizontal and/or vertical scanning signals applied to a CRT display in television receivers.

In FIG. 5, the charge control signal generating circuit 200 includes a phase locked loop (referred as PLL hereafter) 202, a vertical scanning pulse generator 204, a vertical synchronizing signal separation circuit 206 and a counter control circuit 208. The vertical scanning pulse generator 204 is typically constituted by a downcounter.

The PLL 202 is comprised of a voltage controlled oscillator (referred as VCO hereafter) 210, first and second frequency dividers 212 and 214, a horizontal deflection circuit 216, a phase comparator 218 and first and second LPFs 220 and 222. The VCO 210 generates an oscillating signal with a frequency of 32·fH (fH: horizontal frequency). The oscillating signal of the VCO 210 is supplied to the horizontal deflection circuit 216 in series through the first and second frequency dividers 212 and 214. The first and second frequency dividers 212 and 214 are 1/16 and ½ frequency dividers, respectively. Thus, a horizontal scanning pulse HP with the horizontal frequency fH is applied to a CRT display (not shown in the drawing) through the horizontal deflection circuit 216.

The horizontal deflection circuit 216 is provided with a flyback transformer 224, and its primary winding 224a is coupled to the second frequency divider 214 through an amplifier 226. The flyback transformer 224 has a detection winding 224b for detecting a saw tooth wave signal SAW in response to the horizontal scanning pulse HP. The saw tooth wave signal SAW is applied to the phase comparator 218 through the first LPF 220.

The phase comparator 218 compares the phases of the saw tooth wave signal SAW and a composite synchronizing signal CS, which is applied from the composite synchronizing signal separation circuit 10a. A phase error signal PE corrsponding to the phase difference between the saw tooth wave signal SAW and the composite synchronizing signal CS, is applied to the VCO 210 through the second LPF 222. Thus, the VCO 210 is automatically controlled so as to generate the oscillating signal synchronized with a prescribed signal, i.e., the horizontal synchronizing signal HS in the composite synchronizing signal CS.

An output of the PLL 202 from the first frequency divider 212 is applied to the vertical scanning pulse generator 204 and the counter control circuit 208. The output of the first frequency divider 212 will be referred to as the 2·fH signal hereafter.

Figure 6:
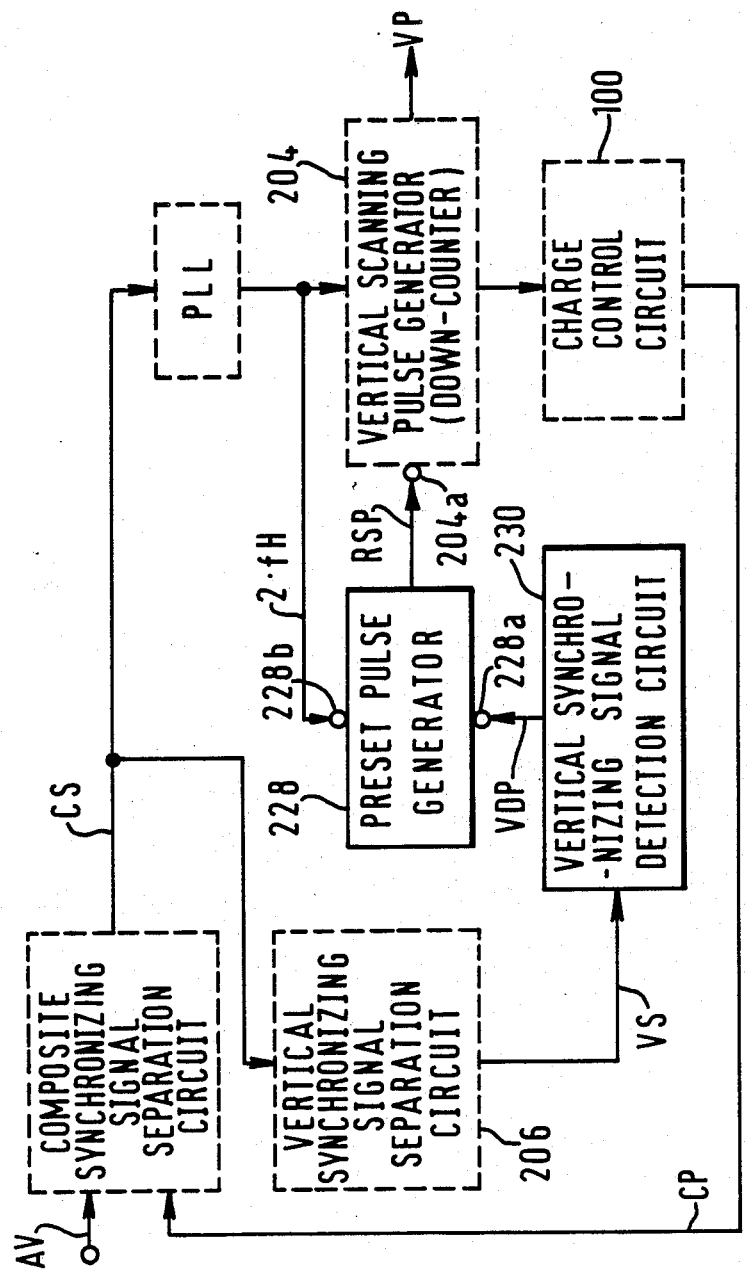
FIG. 6 is a block diagram showing the construction of the counter control circuit 208 of FIG. 5.

The counter control circuit 208 includes a preset pulse generator 228 and a vertical synchronizing signal detection circuit 230, as shown in FIG. 6. The preset pulse generator 228 is supplied with a vertical detection pulse VDP from the vertical synchronizing signal detection circuit 230. The vertical synchronizing signal detection circuit 230 is coupled to the composite synchronizing signal separation circuit 10a through a vertical synchronizing signal separation circuit 206 (see FIG. 5) so as to respond to the vertical synchronizing signal VS in the composite synchronizing signal CS. The vertical synchronizing signal separation circuit 206 will be described in detail later.

The operation of the counter control circuit 208 will be described below, in reference to FIG. 6. The vertical detection pulse VDP is input to a data input terminal 228a of the preset pulse generator 228. The 2·fH signal is applied to a clock input terminal 228b of the preset pulse generator 228. Setting is made in such a manner that in the active period of the vertical detection pulse VDP, when the 2·fH signal falls down, a reset pulse RSP is output from the preset pulse generator 228. The reset pulse RSP is applied to a reset input terminal 204a of the vertical scanning pulse generator 204. For a prescribed period from the leading edge of the reset pulse RSP, the vertical scanning pulse generator 204 outputs a vertical scanning pulse VP. Therefore, the leading edge of the vertical scanning pulse VP is phase-synchronized with the trailing edge of the 2·fH clock signal, and its pulse width is a fixed value multiplied by an integer. The vertical scanning pulse VP is supplied to a vertical deflection circuit 232 through an amplifier 234 (see FIG. 5).

Figure 7:
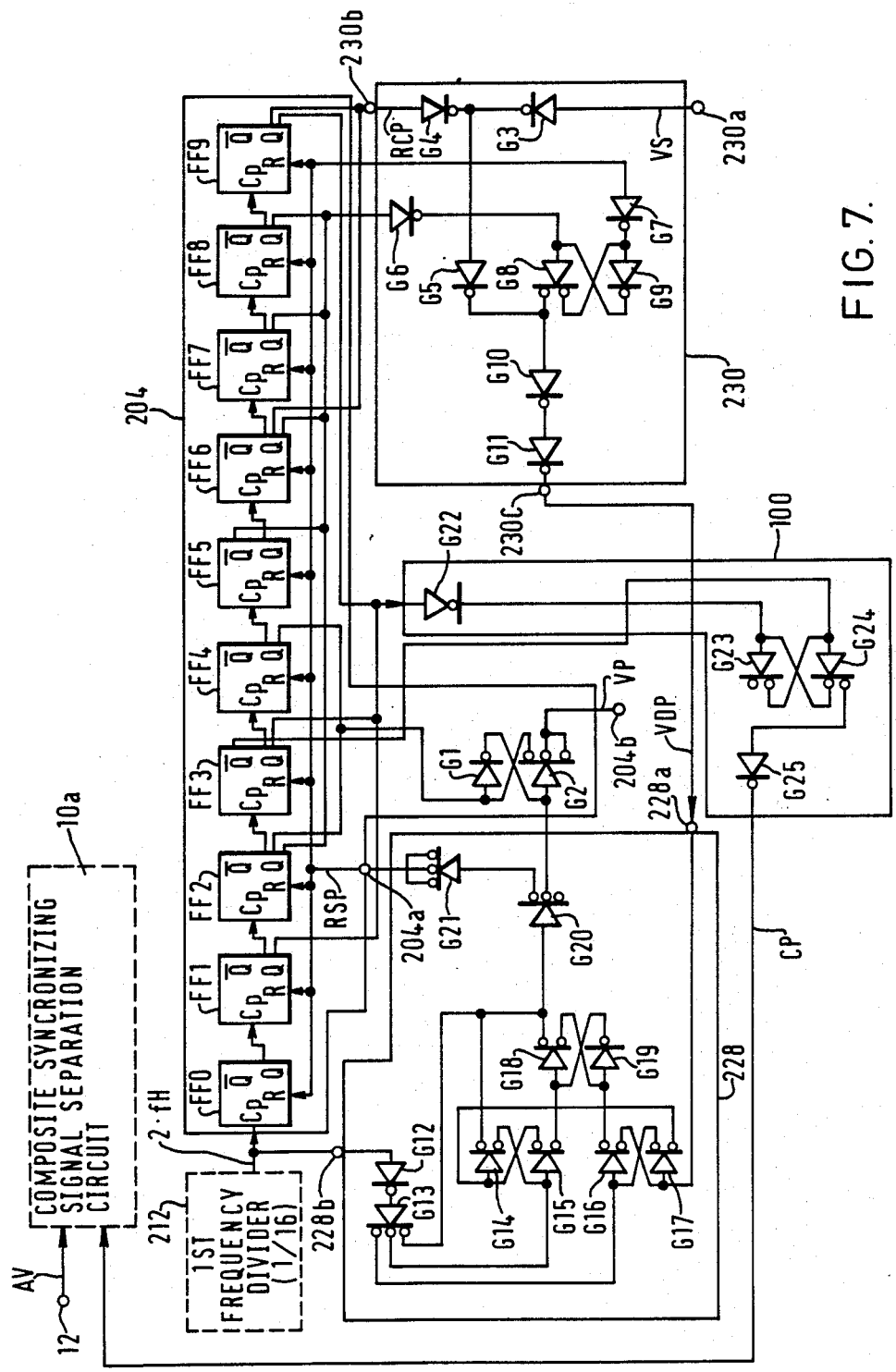
FIG. 7 is a circuit diagram showing the construction of the vertical scanning pulse generator 204, the preset pulse generator 228, the vertical synchronizing signal detection circuit 230 and the charge control circuit 100 in FIG. 5.

Referring now to FIG. 7, a typical circuit counstruction of the vertical scanning pulse generator 204, the vertical synchronizing signal detection circuit 230 and a part of the charge control circuit 100 will be described.

The output of the 1/16 frequency divider 212 is input to the ½ frequency divider 214 for obtaining the horizontal synchronizing pulse HP, and at the same time the output is supplied to the vertical scanning pulse generator 204 for obtaining the vertical scanning pulse VP. The vertical scanning pulse generator 204 is constituted of flip flop circuits FF0 to FF9 and gate circuits G1 and G2. The vertical scanning pulse VP can be obtained from an output terminal 204b of the vertical scanning pulse generator 204.

The vertical synchronizing signal VS is applied to the vertical synchronizing signal detection circuit 230 through an input terminal 230a. A receiving pulse RCP from the vertical scanning pulse generator 204 is supplied to another input terminal 230b of the vertical synchronizing signal detection circuit 230. The vertical synchronizing signal detection circuit 230 is constituted of gate circuits G3 to G11, and outputs a vertical synchronization detection pulse VDP to an output terminal 230C.

The vertical synchronization detection pulse VDP is supplied to an input terminal 228a of the reset pulse generator 228. The 2·fH pulses from the 1/16 frequency divider 212 are supplied to an input terminal 228b of the reset pulse generator 228. The reset pulse generator 228 is constituted of gate circuits G12 to G21, and outputs a reset pulse RSP of a fixed width at the lower of the minimum 2·fH pulse after the rise of the vertical synchronization detection pulse VDP, and adds the pulse to a reset terminal 204a of the vertical scanning pulse generator 204.

The vertical scanning pulse generator 204 outputs the vertical scanning pulse VP of a fixed width to the output terminal 204b through the gate circuit G2 after being supplied with the reset pulse RSP.

Hereupon, the charge control circuit 100 is connected to the vertical scanning pulse generator 204 for controlling the charge operation for the coupling capacitor 34a in the composite synchronizing signal separation circuit 10a. The charge control circuit 100 is constituted of gate circuits G22 to G25.

Figure 8:
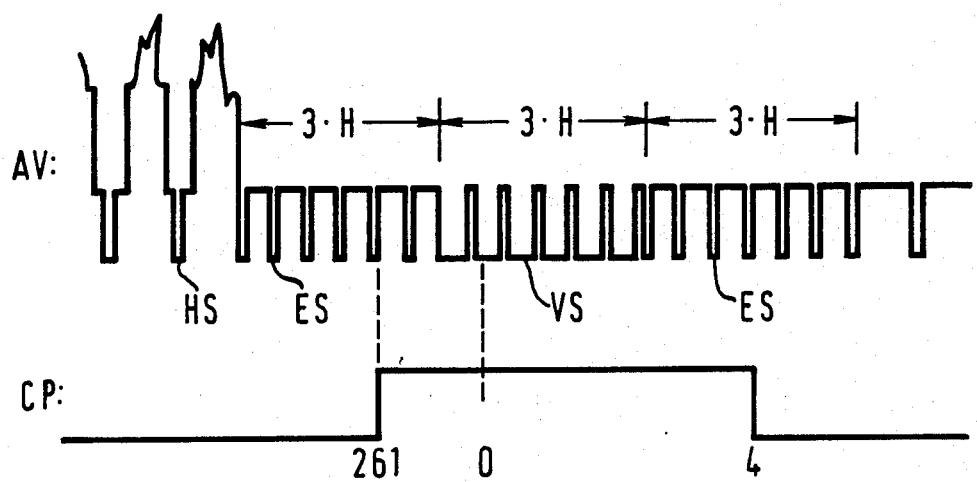
FIG. 8 is a graph showing the signals of FIG. 7.

The partial circuit of charge control circuit 100 is input with outputs of the flip flop circuits FF1, FF3 and FF9 of the vertical scanning pulse generator 204 and generates the charge control pulse CP, as shown in FIG. 8. The charge control pulse CP rises sufficiently before the vertical synchronizing signals VS in the composite video signal AV and falls down sufficiently after the vertical synchronizing signals VS, in response to the outputs of the flip flop circuits FF1, FF3 and FF9. The charge control pulse CP is supplied to the other part of the charge control circuit 100 (see FIG. 4). As a result, the charge control pulse CP can mask the charging operation of the coupling capacitor 34c (see FIG. 4) at least for the period corresponding the vertical synchronizing signals VS.

The charge control pulse CP in the charge control pulse generating circuit 200 is supplied to the base of the transistor 128 in the charge control circuit 100 (see FIG. 4).

According to this embodiment, when forming the synchronizing signal separation circuit, the charge control circuit and the charge control signal generating circuit into an IC (abbreviation of integrated circuit) device, the IC device can be materialized without increasing connection pins and/or circuit elements outside the IC device. This advantageously reduces manufacturing cost of the IC device.

As described above, the present invention can provide an extremely preferable synchronizing signal separation circuit for separating a composite synchronizing signal having a variable peak voltage subject to sudden changes from a composite video signal, the composite synchronizing signal including a vertical synchronizing signal having a predetermined level for controlling vertical scanning in a television receiver.

While there has been illustrated and described what are at present considered to be preferred embodiments of the present invention, it will be understood by those skilled in the art that various changes and modifications may be made, and equivalents may be substituted for elements thereof without departing from the true scope of the invention. In addition, many modifications may be made to adapt a particular situation or material to the teaching of the present invention without departing from the central scope thereof. Therefore, it is intended that this invention not be limited to the particular embodiment disclosed as the best mode contemplated for carrying out this invention, but that the invention include all embodiments falling within the scope of the appended claims.

What is claimed is:

1. A synchronizing signal separation circuit for separating a composite synchronizing signal having a variable peak voltage subject to changes from a composite video signal, the composite synchronizing signal including a vertical synchronizing signal having a predetermined level for controlling vertical scanning in a television receiver, comprising:

composite separation means, including a coupling capacitor having a relatively low capacitance, for separating the composite synchronizing signal from the composite video signal received from a source of video signals; and charge control means including a timing circuit for controlling the charging and discharging of the coupling capacitor, for maintaining the stability and the predetermined level of the vertical synchronizing signal after changes in synchronizing signal peak voltage.

2. The circuit of claim 1 wherein the timing circuit includes counting means for generating a charge control pulse at least for a period corresponding to the vertical synchronizing signal scanning signal.

3. The circuit of claim 2 wherein the timing circuit includes a synchronizing circuit for horizontal and/or vertical scanning signals.

4. The circuit of claim 3 wherein the synchronizing circuit includes a phase locked loop responsive to the synchronizing signal output from the circuit.

5. The circuit of claim 4 wherein the timing circuit also includes reset means for resetting the counting means in synchronism with the vertical synchronizing signal.

6. The circuit of claim 1 wherein the charge control means includes means for charging the coupling capacitor and means for stopping the charging means.

7. The circuit of claim 6 wherein the charging means includes a transistor coupled between a power source and the coupling capacitor.

8. The circuit of claim 7 wherein the charging means also includes a buffer diode for preventing a reverse current flow from the coupling capacitor to the transistor.

9. The circuit of claim 8 wherein the stopping means also includes a second transistor coupled between the first transistor and a grounded terminal.

* * * * *